(12) United States Patent
Hendrickson

(10) Patent No.: US 11,449,185 B1
(45) Date of Patent: Sep. 20, 2022

(54) SYSTEMS AND METHODS FOR PROVIDING CONTENT

(71) Applicant: Meta Platforms, Inc., Menlo Park, CA (US)

(72) Inventor: Jesse Maurice Hendrickson, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/661,159

(22) Filed: Oct. 23, 2019

(51) Int. Cl.
*G06F 3/0481* (2022.01)

(52) U.S. Cl.
CPC .. *G06F 3/0481* (2013.01); *G06F 2203/04803* (2013.01)

(58) Field of Classification Search
CPC .......... G06Q 50/01; G06F 17/00; G06F 3/00; G06F 3/048; G06F 3/0481; G06F 2203/04803
See application file for complete search history.

(56) References Cited

U.S. PATENT DOCUMENTS

| | | | | |
|---|---|---|---|---|
| 8,516,364 B2* | 8/2013 | Demant | ................. | G06F 9/451 715/247 |
| 8,751,924 B2* | 6/2014 | Carper | ................. | G06F 40/177 715/234 |
| 9,396,167 B2* | 7/2016 | Doll | ........................ | G06F 40/14 |
| 10,140,675 B2* | 11/2018 | Sowden | ............. | H04N 1/00185 |
| 10,380,774 B2* | 8/2019 | Chedeau | ............... | G06F 16/904 |
| 2013/0239049 A1* | 9/2013 | Perrodin | ............... | G06F 3/0481 715/800 |
| 2014/0149885 A1* | 5/2014 | Wilder | ................... | G06F 9/451 715/753 |

\* cited by examiner

*Primary Examiner* — Alvin H Tan
(74) *Attorney, Agent, or Firm* — Sheppard Mullin Richter & Hampton LLP

(57) ABSTRACT

Systems, methods, and non-transitory computer-readable media can receive a plurality of content items to be presented to a user in a content grid user interface, wherein the content grid user interface is divided into a plurality of columns, the plurality of content items are arranged in an order, and each content item of the plurality of content items is associated with an aspect ratio and a span value indicative of the number of columns the content item will occupy within the content grid user interface. A first content item in the plurality of content items is selected based on the order, wherein the first content item is associated with a first span value and a first aspect ratio. A position within the content grid user interface is determined for the first content item based on the first span value and the first aspect ratio.

20 Claims, 14 Drawing Sheets

500

Receive a plurality of content items to be presented to a user in a content grid user interface, wherein the content grid user interface is divided into a plurality of columns, the plurality of content items are arranged in an order, and each content item of the plurality of content items is associated with an aspect ratio and a span value indicative of the number of columns the content item will occupy within the content grid user interface
502

Select a first content item of the plurality of content items based on the order, wherein the first content item is associated with a first span value and a first aspect ratio
504

Determine a position within the content grid user interface for the first content item based on the first span value and the first aspect ratio
506

FIGURE 5

SYSTEMS AND METHODS FOR PROVIDING CONTENT

FIELD OF THE INVENTION

The present technology relates to digital content provision. More particularly, the present technology relates to graphical user interfaces for providing digital content.

BACKGROUND

Today, people often utilize computing devices (or systems) for a wide variety of purposes. Users can use their computing devices to, for example, interact with one another, access content, share content, and create content. In some cases, content items can include postings from members of a social networking system. Content items may include media content items, such as images or videos. Content items may be published to the social networking system or any other content platform for consumption by others.

SUMMARY

Various embodiments of the present technology can include systems, methods, and non-transitory computer readable media configured to receive a plurality of content items to be presented to a user in a content grid user interface, wherein the content grid user interface is divided into a plurality of columns, the plurality of content items are arranged in an order, and each content item of the plurality of content items is associated with an aspect ratio and a span value indicative of the number of columns the content item will occupy within the content grid user interface. A first content item in the plurality of content items is selected based on the order, wherein the first content item is associated with a first span value and a first aspect ratio. A position within the content grid user interface is determined for the first content item based on the first span value and the first aspect ratio.

In an embodiment, each column of the plurality of columns is associated with a height value.

In an embodiment, determining the position within the content grid user interface for the first content item comprises identifying one or more columns of the plurality of columns that have a smallest height value amongst the plurality of columns.

In an embodiment, determining the position within the content grid user interface for the first content item comprises determining whether the first content item can fit within a highest available position of a leftmost column of the one or more columns based on the first span value.

In an embodiment, determining whether the first content item can fit within the highest available position of the leftmost column of the one or more columns based on the first span value comprises: determining that the first content item cannot fit within the highest available position of the leftmost column of the one or more columns, marking the leftmost column of the one or more columns as visited, wherein the plurality of columns comprise a set of visited columns and a set of unvisited columns, and identifying one or more unvisited columns of the set of unvisited columns that have a smallest height value amongst the set of unvisited columns.

In an embodiment, determining the position within the content grid user interface for the first content item comprises positioning the first content item within a first column of the plurality of columns, and updating a height value associated with the first column based on the positioning the first content item within the first column.

In an embodiment, updating the height value associated with the first column comprises: calculating a height of the first content item based on a width of the first column and the first aspect ratio.

In an embodiment, updating the height value associated with the first column further comprises: updating the height value associated with the first column based on the height of the first content item.

In an embodiment, the width of the first column, the height of the first content item, and the height value associated with the first column are measured in pixels.

In an embodiment, a second content item of the plurality of content items is selected based on the order, wherein the second content item is associated with a second span value and a second aspect ratio. A position within the content grid user interface is determined for the second content item based on the second span value and the second aspect ratio.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method, according to an embodiment of the present technology.

Figure 1:
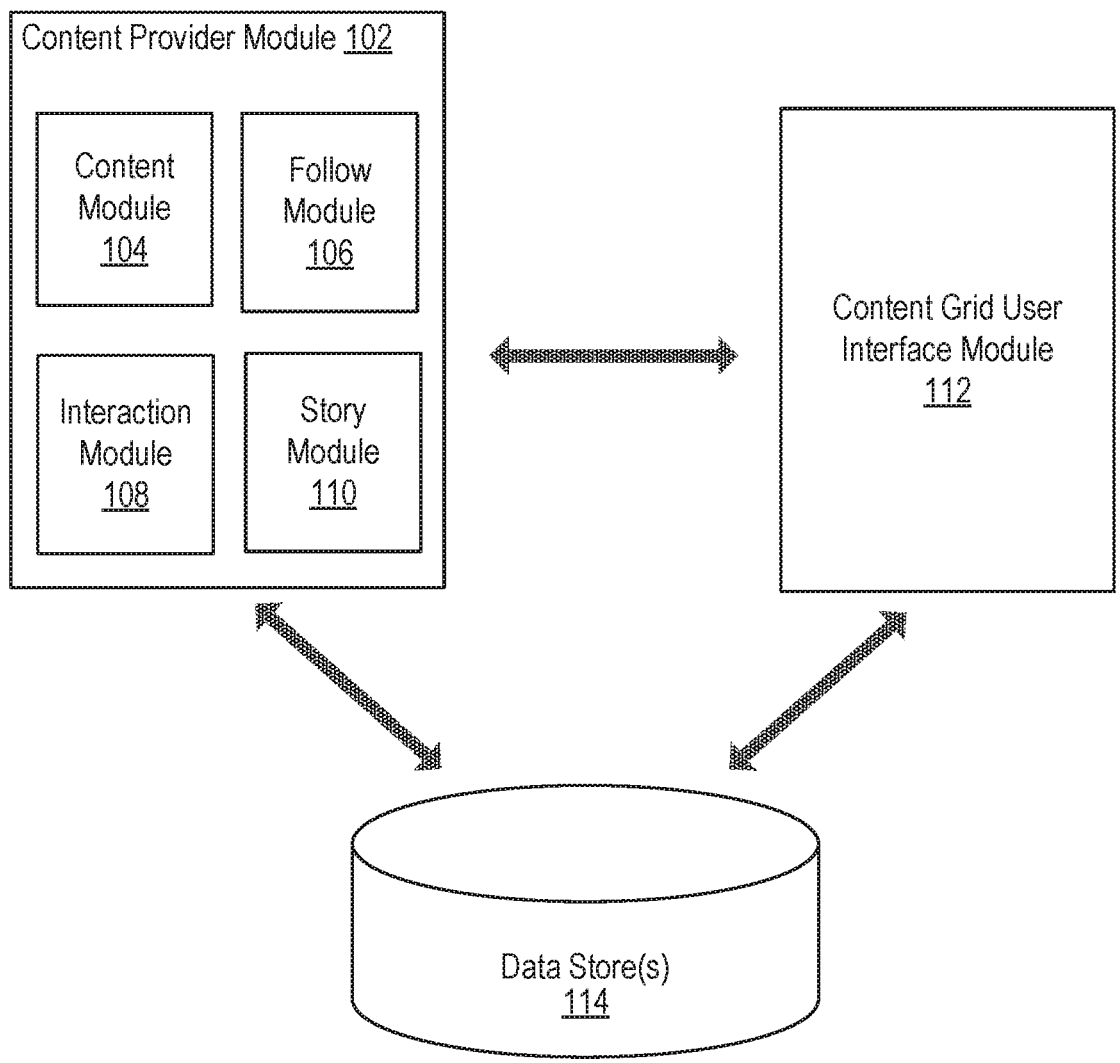
FIG. 1 illustrates an example system including a content provider module and a content grid user interface module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Digital Content

People often utilize computing devices (or systems) for a wide variety of purposes. Users can use their computing devices to, for example, interact with one another, access content, share content, and create content. In some cases, content items can include postings from members of a social networking system. Content items may include media content items, such as images or videos. Content items may be published to the social networking system or any other content platform for consumption by others.

A content platform, such as a social networking system, may provide users with one or more graphical user interfaces to access content available on the content platform. User experience with a content platform may be affected, either positively or negatively, by graphical user interfaces offered by the content platform. Intuitive and easy-to-use graphical user interfaces may provide users with positive experiences while difficult or confusing graphical user interfaces may result in frustrating experiences and may dissuade future utilization of the content platform by users. As such, it is an important consideration for digital content platforms and content providers to provide users with pleasing and easy-to-understand graphical user interfaces for accessing content on the content platform.

Grid-based user interfaces, such as grid-based scrolling content feeds, have become a popular and well-accepted approach for presenting multimedia content to users, particularly in mobile device applications. However, many mobile devices do not provide a convenient or intuitive way for content providers to render such grid-based user interfaces in mobile applications. For example, certain mobile device operating systems may provide tools for rendering a "list" of content items that have a single column, but may not provide native tools for rendering content grids with multiple columns. Under conventional approaches, mobile application developers have simulated the appearance of multiple columns by combining multiple objects (e.g., images, videos) into a single merged object such that a row that presents the single merged object appears to have multiple columns. For example, if a developer intends for a mobile application to display a scrolling content feed with three columns of images, the mobile application could be designed to, for each row, select three images and merge them into a single image object with the three images presented horizontally adjacent to one another to simulate the appearance of three separate columns (when, in fact, the mobile application is displaying only a single column of objects). However, such approaches are inefficient, requiring significant pre-processing of objects in order to create the merged objects. Such conventional approaches also present significant challenges when attempting to present different types of objects in the same grid-based user interface (e.g., an image in one column, a video in an adjacent column, and live-stream video in another adjacent column). Such conventional approaches also present significant challenges when attempting to present objects of varying sizes (e.g., varying aspect ratios, heights, widths, etc.). Conventional approaches may not be effective in addressing these and other problems arising in computer technology.

An improved approach rooted in computer technology overcomes the foregoing and other disadvantages associated with conventional approaches specifically arising in the realm of computer technology. In general, the presently disclosed technology can provide a layout manager for arranging and rendering a content grid user interface. The content grid user interface can comprise a plurality of columns for presenting a plurality of content items. The layout manager can be configured to receive an ordered set of content items to be presented in the content grid user interface. Content items can include, for example, images, videos, and the like. Each content item in the ordered set of content items can be associated with size information. For example, each content item can be associated with an aspect ratio and a span value indicative of the number of columns the content item will occupy within the content grid user interface. The layout manager can be configured to iterate through the ordered set of content items to determine a position for each content item within the content grid user interface. In an embodiment, for each content item, the layout manager may identify an upper-left-most position in the content grid user interface within which the content item can fit based on the size of the content item and sizes and positions of previously-placed content items. Using the disclosed technology, content items of varying types and sizes can be efficiently arranged and rendered in a content grid user interface. More details relating to the disclosed technology are provided below.

FIG. 1 illustrates an example system 100 including a content provider module 102 and a content grid user interface module 112, according to an embodiment of the present technology. The content provider module 102 and the content grid user interface module 112 can collectively be configured to provide users with access to content posted to a digital content platform, such as a social networking system. In some embodiments, the content provider module 102 can be implemented on a server while the content grid user interface module 112 can be implemented on a client. Such content can include content items that are accessible using a content grid user interface, such a grid-based scrolling content feed. As shown in the example of FIG. 1, the content provider module 102 can include a content module 104, a follow module 106, an interaction module 108, and a story module 110. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 and/or the content grid user interface module 112 can be implemented in any suitable combinations.

In some embodiments, the content provider module 102 and/or the content grid user interface module 112 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 and/or the content grid user interface module 112 can be, in part or in whole, implemented as software running on one or more computing devices or systems, such as on a server system or a client computing device. In some instances, the content provider module 102 and/or the content grid user interface module 112 can be, in part or in whole, implemented within or configured to operate in conjunction with or be integrated with a social networking system (or service), such as a social networking system 630 of FIG. 6. Likewise, in some instances, the content provider module 102 and/or the content grid user interface module 112 can be, in part or in whole, implemented within or configured to operate in conjunction with or be integrated with a client computing device, such as the user device 610 of FIG. 6. For example, the content provider module 102 and/or the content grid user interface module 112 can be implemented as or within a dedicated application (e.g., app), a program, or an applet running on a user computing device or client computing system. The application incorporating or implementing instructions for performing functionality of the content provider module 102 and/or the content grid user interface module 112 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 and/or the content grid user interface module 112 can be configured to communicate and/or operate with the at least one data store 114, as shown in the example system 100. The data store 114 can represent one data store or can represent multiple or distributed data stores, and can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the content provider module 102 and/or the content grid user interface module 112. For example, the data store 114 can store user-uploaded content items. It is contemplated that there can be many variations or other possibilities.

The content module 104 can be configured to provide users with access to content that is available through a digital content platform, such as a social networking system. In some instances, this content can include content items posted in content feeds accessible through the social networking system, i.e., content posts. For example, the content module 104 can provide a first user with access to content posts through an interface that is provided by a software application (e.g., a social networking application) running on a computing device of the first user. The first user can also interact with the interface to post content posts to the social networking system. Such content posts may include text, images, audio, and videos, to name some examples. For example, the first user can submit a content post to be published through the social networking system. In some embodiments, the content post can include, or reference, one or more media content items, such as images, video, audio, and/or text.

In various embodiments, other users of the social networking system can access content posts posted by the first user. In one example, the other users can access the content posts by searching for the first user by user name through an interface provided by a software application (e.g., a social networking application, browser, etc.) running on their respective computing devices. In some instances, some users may want to see content posts posted by the first user in their respective content feed. To cause content posts posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content posts that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that content posts posted by the first user are no longer included in the content feed of the user.

In some instances, users may want to interact with content posts posted to a social networking system. For example, a user may want to endorse, or "like", a content post. In this example, the user can select an option provided in the interface to like the desired content post. The interaction module 108 can determine when a user likes a given content post and can store information describing this relationship. The interaction module 108 can also determine when other forms of user interaction are performed and can store information describing the interaction (e.g., information describing the type of interaction, the identity of the user, the identity of the user that posted the content post, and the content post, to name some examples). For example, the user may want to post a comment in response to a content post. In this example, the user can select an option provided in the interface to enter and post the comment for the desired content post. The interaction module 108 can determine when a user posts a comment in response to a given content post and can store information describing this relationship. Other forms of user interaction can include emoji-based reactions to a content post (e.g., selecting an option that corresponds to a particular reaction emoji, e.g., happy, sad, angry, etc.), re-sharing a content post, and transmitting a message to a user pertaining to a particular content post, for example.

In some embodiments, the story module 110 can provide an option that allows users to post their content as stories. In such embodiments, each user has a corresponding story collection in which the user can post content. When a user's story collection is accessed by another user, the story module 110 can provide content posted in the story collection to the other user for viewing. In certain embodiments, each user can have a story feed in which they can view stories posted by other users to their respective story collections. As such, a user's story feed can include the story collections of one or more users (e.g., one or more users that the user follows). In some embodiments, content posted in a user's story collection may be accessible by any user of the social networking system. In some embodiments, content posted in a user's story collection may only be accessible to followers of the user. In some embodiments, user stories posted to a user's story collection expire after a pre-defined time interval (e.g., every 24 hours). In such embodiments, content posted as a story in a story collection is treated as ephemeral content that is made inaccessible once the pre-defined time interval has elapsed. In contrast, content posted in certain other content feeds, such as a user (or follower) primary content feed, can be treated as non-ephemeral content that remains accessible for a longer and/or an indefinite period of time.

The content grid user interface module 112 can be configured to provide (e.g., arrange, generate, and/or render on a user computing device) a content grid user interface through which users can access content items available on a content platform. The content grid user interface module 112 may, for example, interact with the content provider module 102 in order to access content items posted to a content platform. As referenced, the content grid user interface module 112 may act as a layout manager for arranging and rendering a content grid user interface. More details regarding the content grid user interface module 112 will be provided below with reference to FIG. 2.

Figure 2:
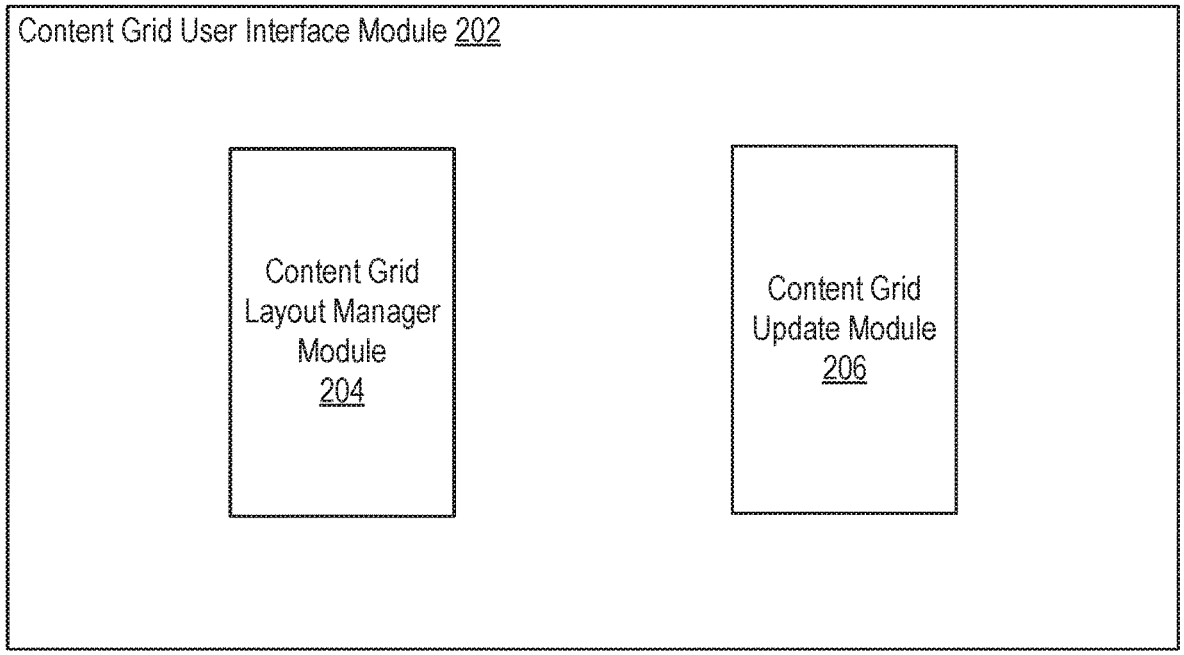
FIG. 2 illustrates an example content grid user interface module, according to an embodiment of the present technology.

FIG. 2 illustrates an example content grid user interface module 202 configured to provide a content grid user interface, according to an embodiment of the present technology. In some embodiments, the content grid user interface module 112 of FIG. 1 can be implemented as the content grid user interface module 202. As shown in the example of FIG. 2, the content grid user interface module 202 can include a content grid layout manager module 204 and a content grid update module 206.

The content grid layout manager module 204 can be configured to receive a set of content items to be presented in a content grid user interface. The content grid user interface can comprise a pre-defined plurality of columns for presenting a plurality of content items (e.g., 3 columns, 4 columns, 5 columns, etc.). In an embodiment, the set of content items may be an ordered set of content items such that the set of content items defines an order or ranking for the set of content items. Content items included in the set of content items can include various types of content items, such as ephemeral or non-ephemeral images, ephemeral or non-ephemeral videos, live-stream videos, etc. Each content item in the set of content items can be associated with size information. For example, each content item can be associated with a span value indicative of the number of columns the content item will occupy within the content grid user interface, and an aspect ratio. In an embodiment, span values may be limited to integers. In an embodiment, content items in the ordered set of content items may be ordered and/or ranked based on one more machine learning models. In an embodiment, the ordering and/or ranking of content items may be determined based on and/or indicative of a predicted level of interest or a predicted likelihood of a viewing user to interact with the content items.

Each column in the content grid user interface can be equal in width (e.g., each column may be 300 pixels wide). For each column, the content grid layout manager module 204 can maintain a height value measured from a top most position of the column and indicative of the lowest occupied position in the column. For example, if a column does not have any content items placed in it, the height value for that column may be 0 pixels. If a content item having a height of 100 pixels is placed in a column, the height value for that column may be 100 pixels. If three content items, each having a height of 100 pixels, are placed in the column, the height value may be 300 pixels.

The content grid layout manager module 204 can be configured to iterate through the set of content items to determine a position for each content item within the content grid user interface. If the set of content items is an ordered set of content items, the content grid layout manager module 204 can iterate through the set of content items based on the order (or ranking) of the content items (e.g., a highest ranked content item is placed within the content grid user interface first, a second highest ranked content item is placed within the content grid user interface second, etc.).

Figure 3:
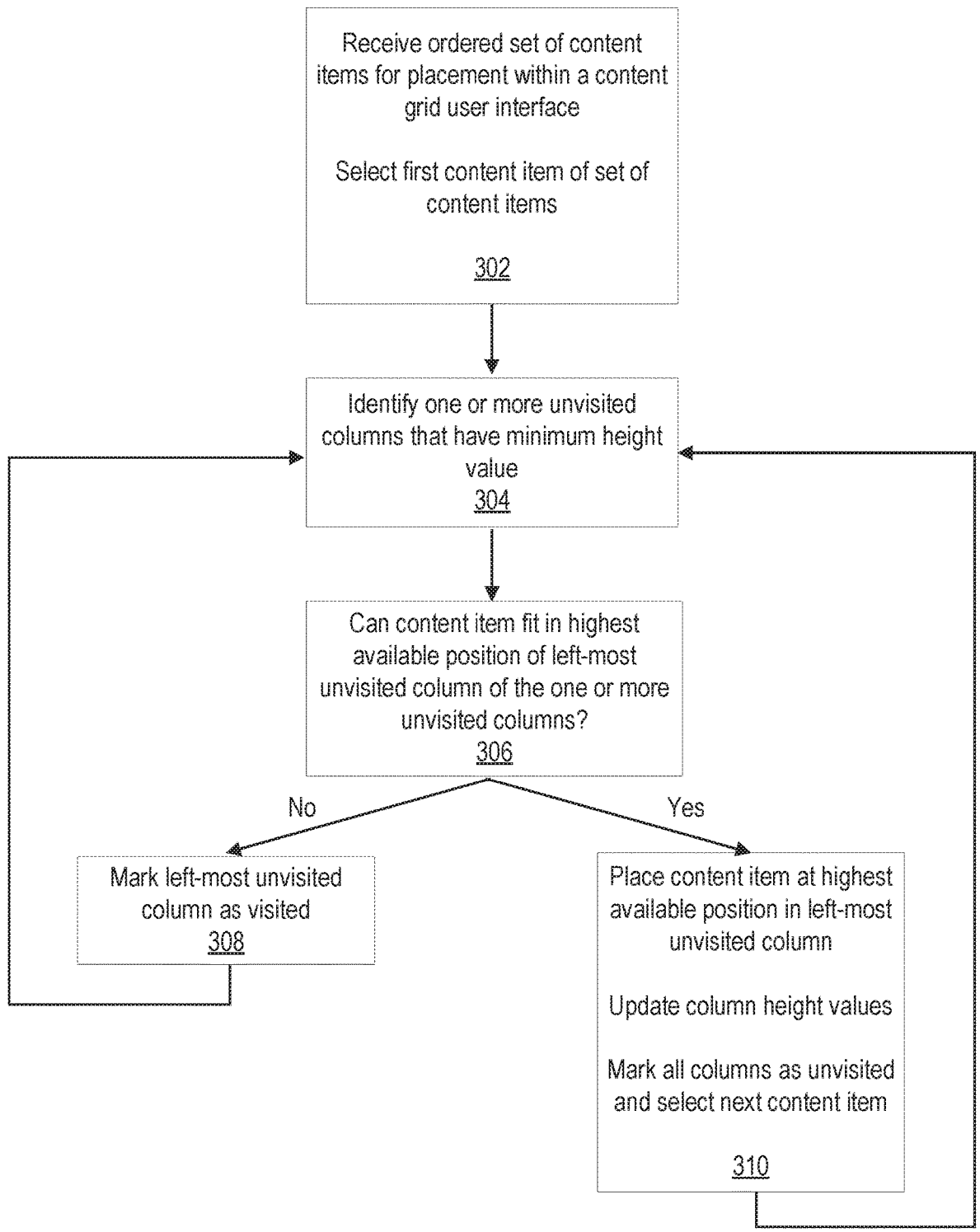
FIG. 3 illustrates an example flow chart associated with arranging content items in a content grid user interface, according to an embodiment of the present technology.

In an embodiment, for each content item in a set of content items, the content grid layout manager module 204 may identify an upper-left-most position in the content grid user interface within which the content item can fit based on size information for the content item and the sizes and positions of previously-placed content items. FIG. 3 illustrates an example implementation for identifying an upper-left-most available position in a content grid user interface for each content item in a set of content items, according to an embodiment of the present technology. In an embodiment, each time a new content item from the set of content items is selected for placement within the content grid user interface, each column in the content grid user interface may be marked as "unvisited." At block 302, the content grid layout manager module 204 can receive an ordered set of content items for placement within a content grid user interface, and select a first content item of the set of content items. At block 304, the content grid layout manager module 204 can identify one or more unvisited columns that have a minimum (i.e., smallest) height value among the unvisited columns in the content grid user interface. The content grid layout manager module 204 can then identify a left-most unvisited column of the one or more unvisited columns that have the minimum height value. At block 306, the content grid layout manager module 204 determines whether the content item can be placed at a highest available position in the left-most column having the minimum height value based on size information associated with the content item. If yes, at block 310, the content item is placed at the highest available position in that column. Height values for each column are updated based on placement of the content item in the column. Then, the next content item from the set of content items is selected for placement in the content grid user interface, and all columns are once again marked as unvisited. If it is determined that the content item cannot be placed in the left-most unvisited column having the minimum height value, at block 308 the left-most unvisited column having the minimum height value is marked as "visited." The process then returns to block 304. This continues iteratively until an acceptable position is determined for the content item.

Although various examples disclosed herein may discuss the present technology as identifying an upper-left-most position for each content item, it will be understood that in alternative embodiments, the content grid layout manager module 204 can be adjusted to prioritize alternative positions for content items (e.g., a lower-left-most position, an upper- or lower-right-most position, a central position, etc.).

Figure 4A:
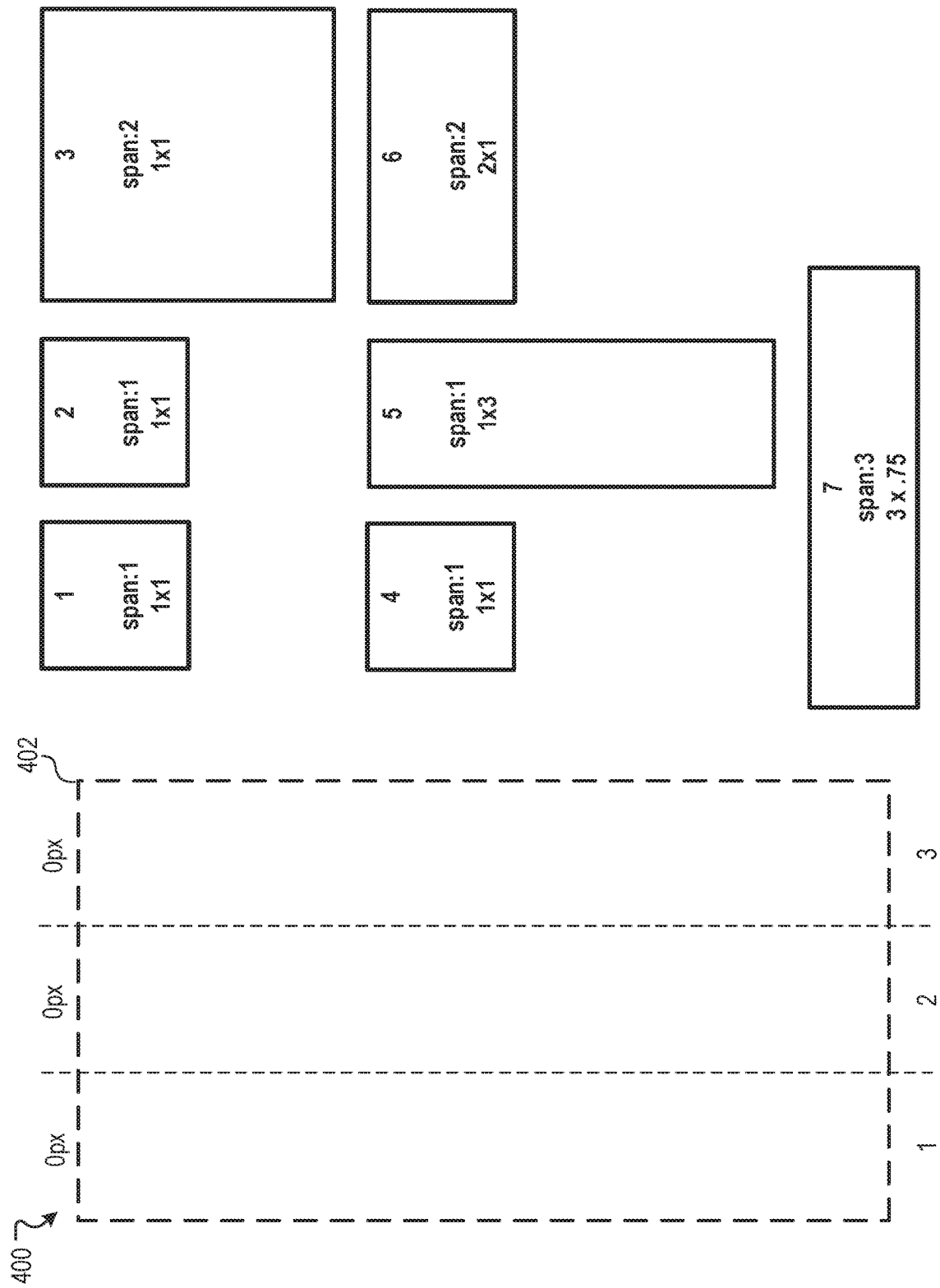
FIGS. 4A-4H illustrate an example scenario associated with arranging content items in a content grid user interface, according to an embodiment of the present technology.

FIGS. 4A-H illustrate an example scenario 400 to demonstrate operation of the content grid layout manager module 204, according to an embodiment of the present technology. In the example scenario 400, the content grid layout manager module 204 is configured to identify an upper-left-most available position for each content item according to the present technology. In FIG. 4A, the content grid layout manager module 204 receives an ordered set of content items (content items 1-7) to be presented in a content grid user interface 402. As can be seen, the set of content items can include content items of varying sizes (e.g., varying widths, heights, aspect ratios, etc.). In the example scenario 400, the content grid user interface 402 is a grid-based scrolling content feed. In the example shown, the content grid user interface 402 has three columns (columns 1, 2, 3). As an example, each column is 100 pixels wide. Each content item is associated with size information, which includes a span value and an aspect ratio. In an embodiment, a height value can be calculated based on the width of a column, a span value associated with the content item, and an aspect ratio associated with the content item. For example, content item 1 has a span value of 1, indicating that the content item will occupy one column, and an aspect ratio of 1. As such, given that each column in the content grid user interface 402 is 100 pixels wide, content item 1 has dimensions of 100 pixels by 100 pixels. In this example, the value of 100 pixels would indicate a height value for the column based on placement of content item 1 in the column.

Figure 4B:
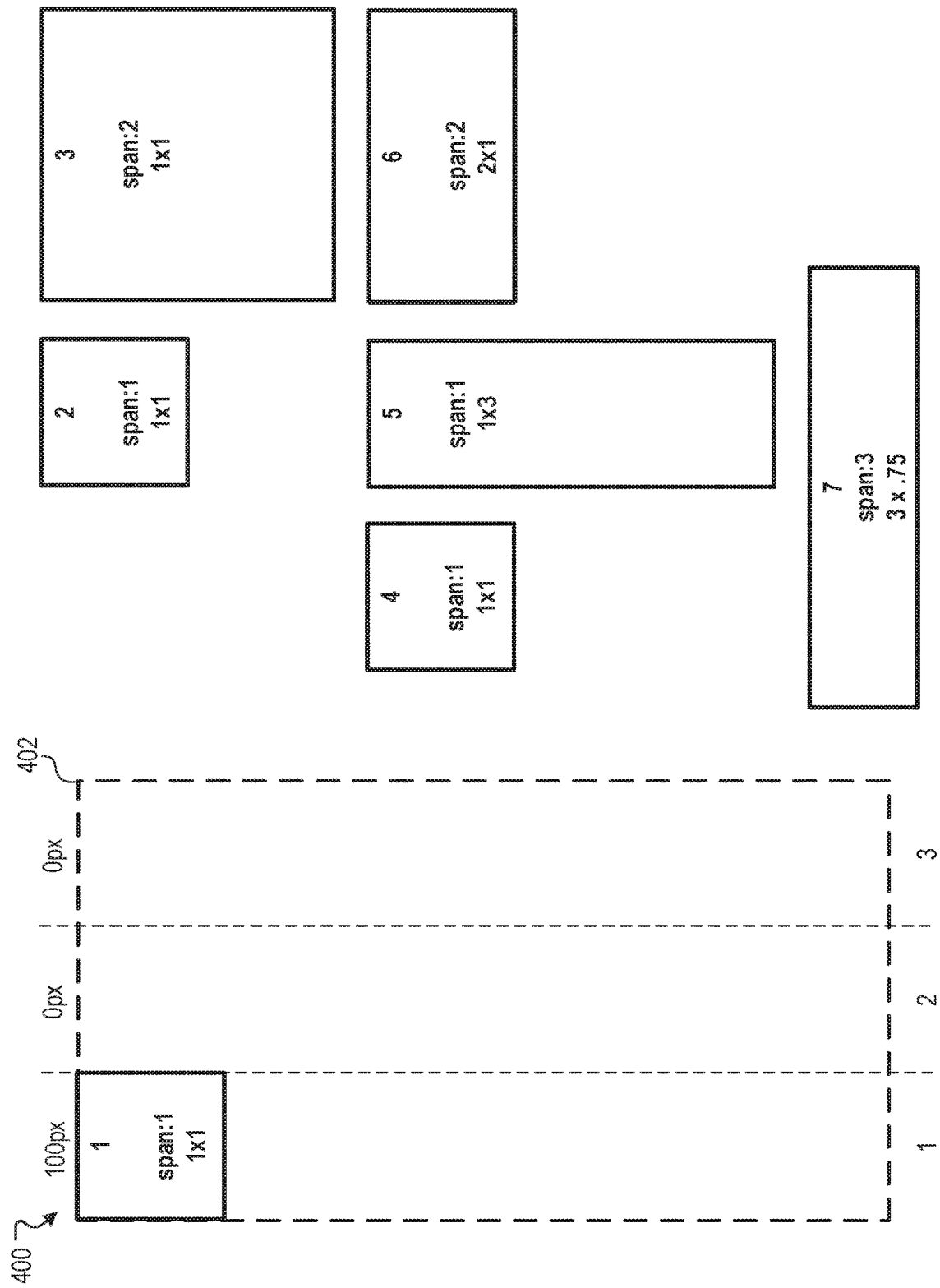
Figure 4C:
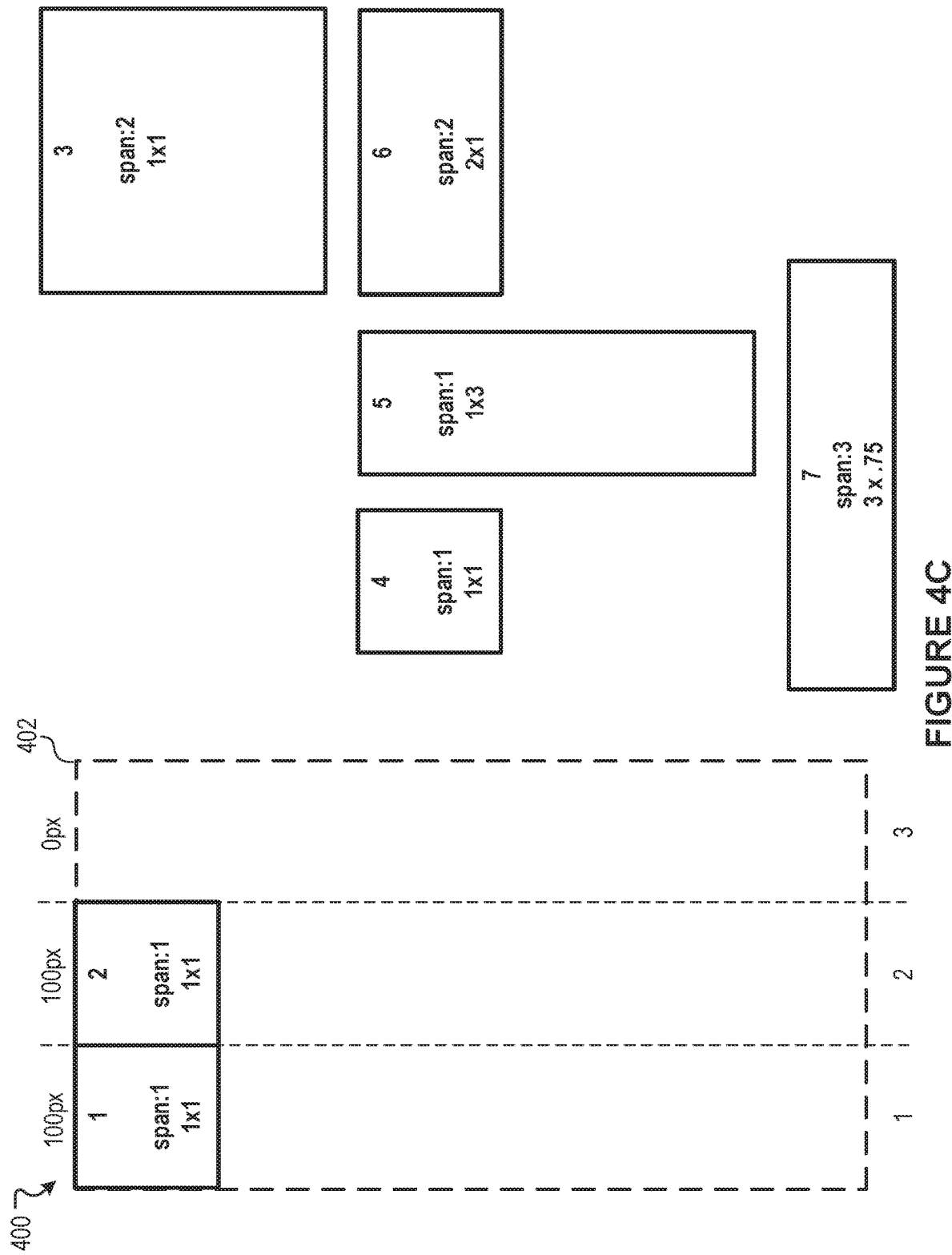
Figure 4D:
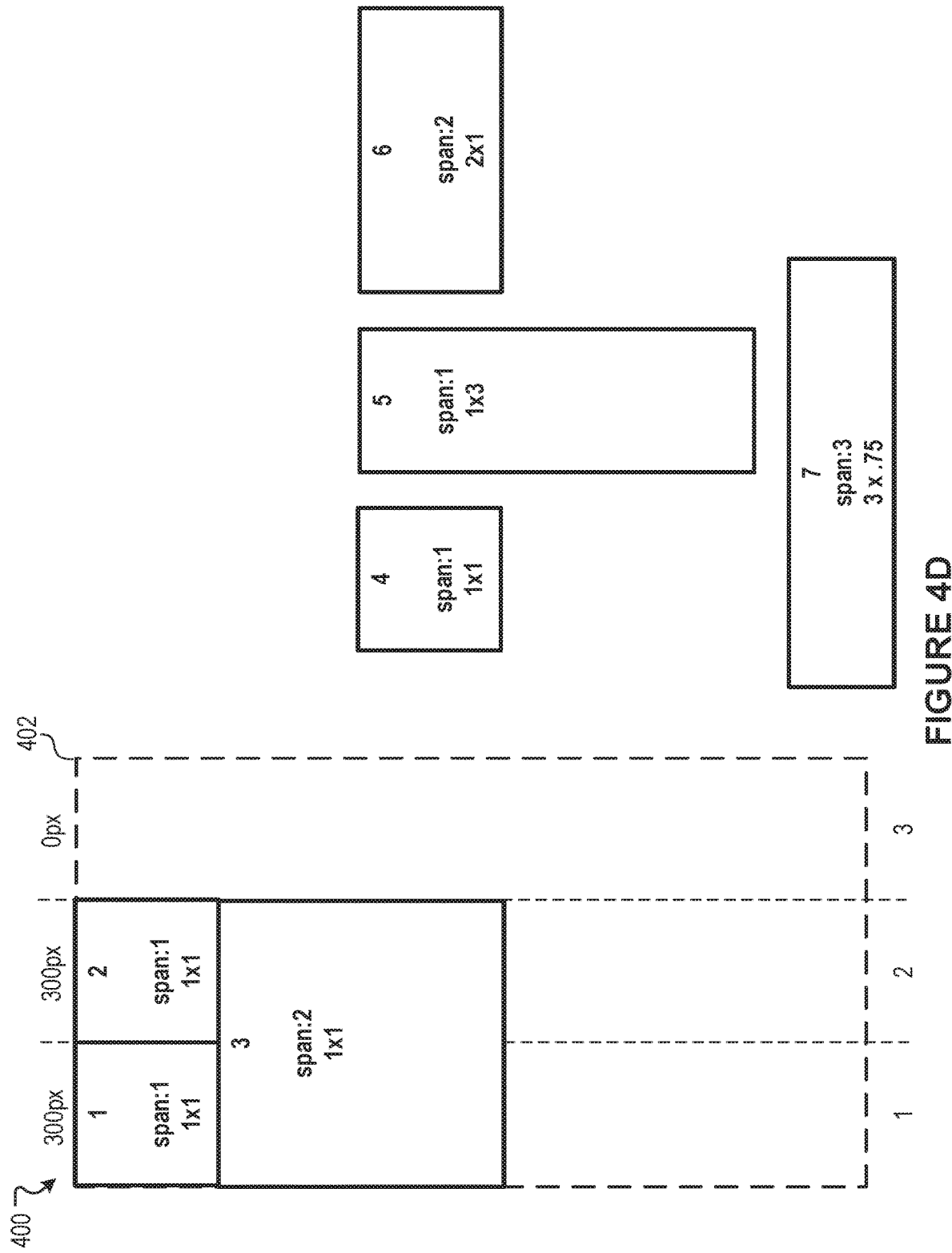

In the example scenario 400, the content grid layout manager module 204 selects the first content item (content item 1) (block 302 of FIG. 3). The content grid layout manager 204 then identifies all unvisited columns that have a minimum (i.e., smallest) height value amongst the plurality of unvisited columns in the content grid user interface 402. In FIG. 4A, all the columns are unvisited, and no content items have been positioned or placed in the content grid user interface 402. As such, all three unvisited columns have a height of 0 pixels. The content grid layout manager module 204 then identifies a left-most unvisited column having the minimum height value, which in this case is column 1. The content grid layout manager module 204 determines whether the content item (content item 1) can fit in a highest available position in that column (block 306 of FIG. 3). In this case, the content item has a span of one column, and can fit in the highest available position in column 1. In FIG. 4B, content item 1 is placed at the highest available position in column 1, and the height value for column 1 is updated to 100 pixels.

In the example scenario 400, the content grid layout manager module 204 then selects the next content item in the ordered set (content item 2), marks all of the columns as unvisited, and repeats the process (block 310 of FIG. 3). The content grid layout manager module 204 identifies all unvisited columns that have the smallest height value (block 304 of FIG. 3). Now that content item 1 is placed in column 1, column 1 has a height value of 100 pixels, and only columns 2 and 3 have the smallest height value (0 pixels). The content grid layout manager module 204 identifies the left-most column of these columns (column 2), and determines whether content item 2 can fit in a highest available position in that column (block 306 of FIG. 3). The answer is yes. As such, content item 2 is placed at the highest available position in column 2 in FIG. 4C, and the height value for column 2 is updated to 100 pixels (block 310 of FIG. 3).

In the example scenario 400, the content grid layout manager module 204 selects the next content item in the ordered set (content item 3) and marks all of the columns as unvisited (block 310 of FIG. 3). The content grid layout manager module 204 identifies all unvisited columns that have the smallest height value (block 304 of FIG. 3). In this case, column 3 has the smallest height value (0 pixels). The content grid layout manager module 204 determines whether content item 3 can fit in the highest available position in column 3 (block 306 of FIG. 3). However, in this case, content item 3 spans two columns, and cannot fit in the highest available position in column 3. As such, column 3 is marked as visited (block 308 of FIG. 3), and the content grid layout manager module 204 once again identifies all unvisited columns that have the smallest height value of all unvisited columns (block 304 of FIG. 3). Only columns 1 and 2 remain unvisited. They both have a height value of 100 pixels, and so they both have the smallest height value of all unvisited columns. The content grid layout manager module 204 selects the leftmost column of those columns (column 1), and determines whether the content item can fit in the highest available position of that column (block 306 of FIG. 3). Content item 3 can fit in the highest available position in column 1, so it is placed in column 1, spanning into column 2, in FIG. 4D. Height values for columns 1 and 2 are updated to 300 pixels to reflect the fact that content item 3 now occupies those two columns.

Figure 4E:
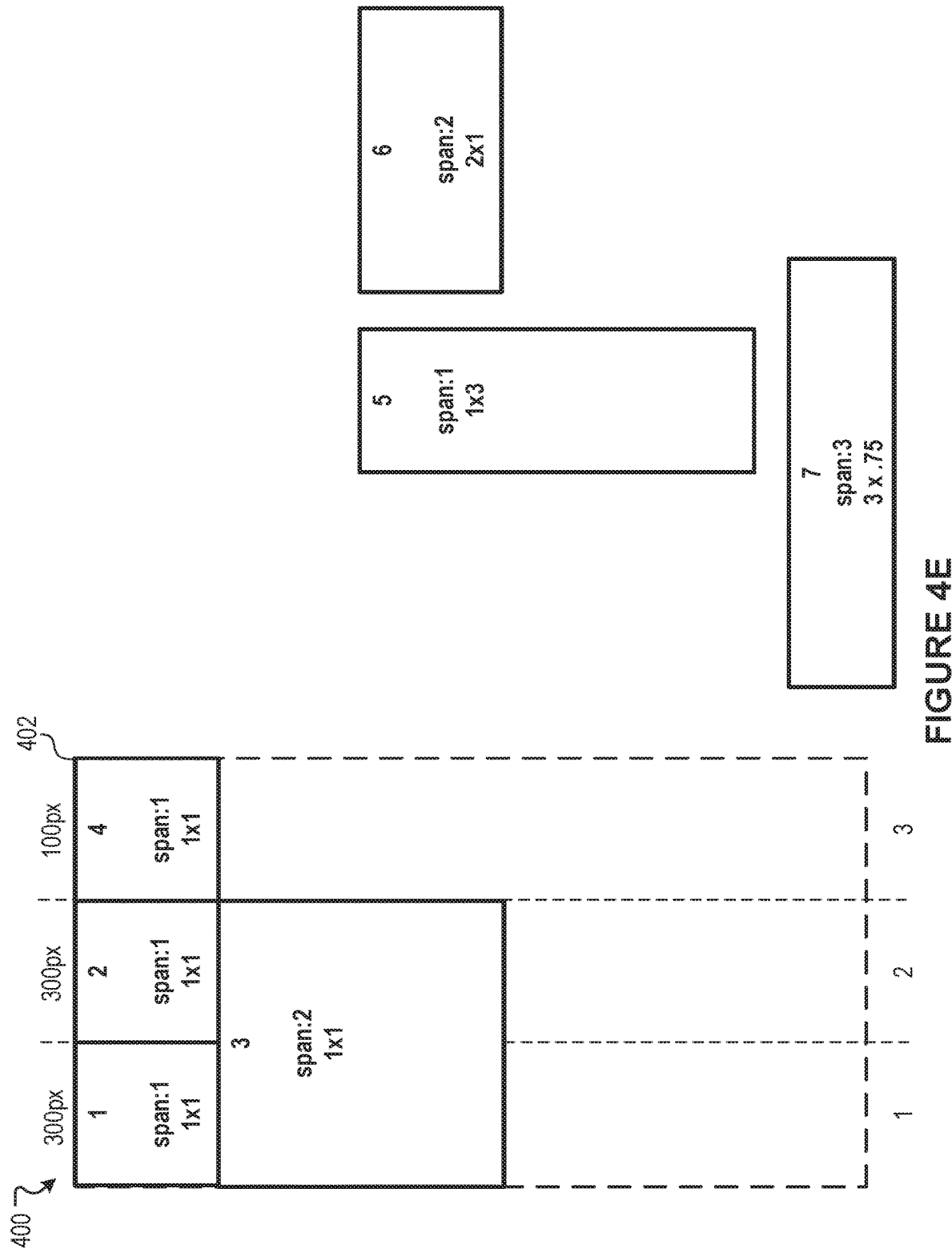

In the example scenario 400, the content grid layout manager module 204 selects the next content item in the ordered set (content item 4) and marks all the columns as unvisited. The content grid layout manager module 204 identifies column 3 as the unvisited column that has the smallest height value, and determines that content item 4 can fit, so it is placed in column 3 and the height value for column 3 is updated to 100 pixels (FIG. 4E).

Figure 4F:
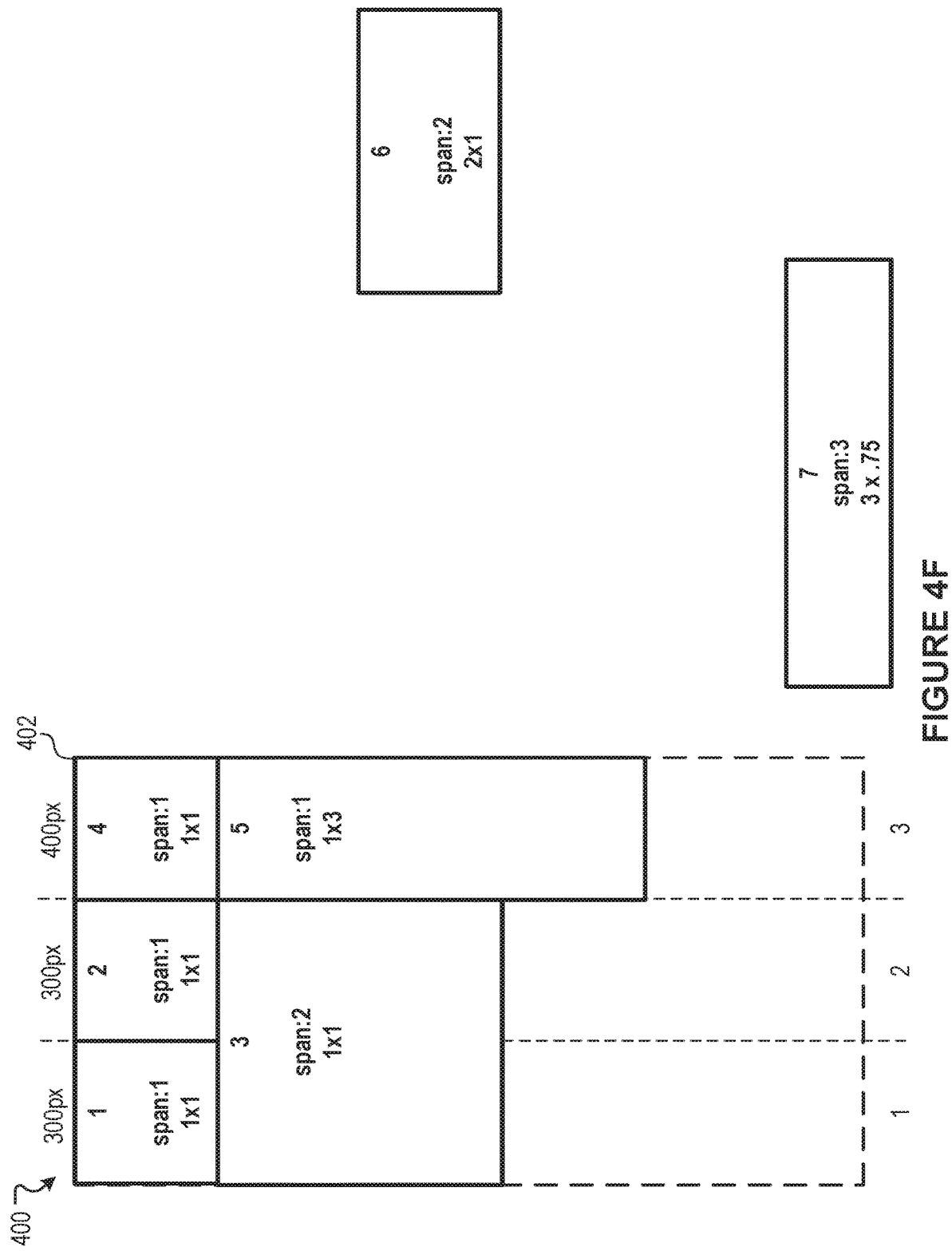

In the example scenario 400, the content grid layout manager module 204 selects the next content item (content item 5) and marks all the columns as unvisited. The content grid layout manager module 204 identifies column 3 as the unvisited column that has the smallest height value, and determines that content item 5 can fit in the highest available position of column 3. So it is placed in column 3 and the height value for column 3 is updated to 400 pixels (FIG. 4F).

Figure 4G:
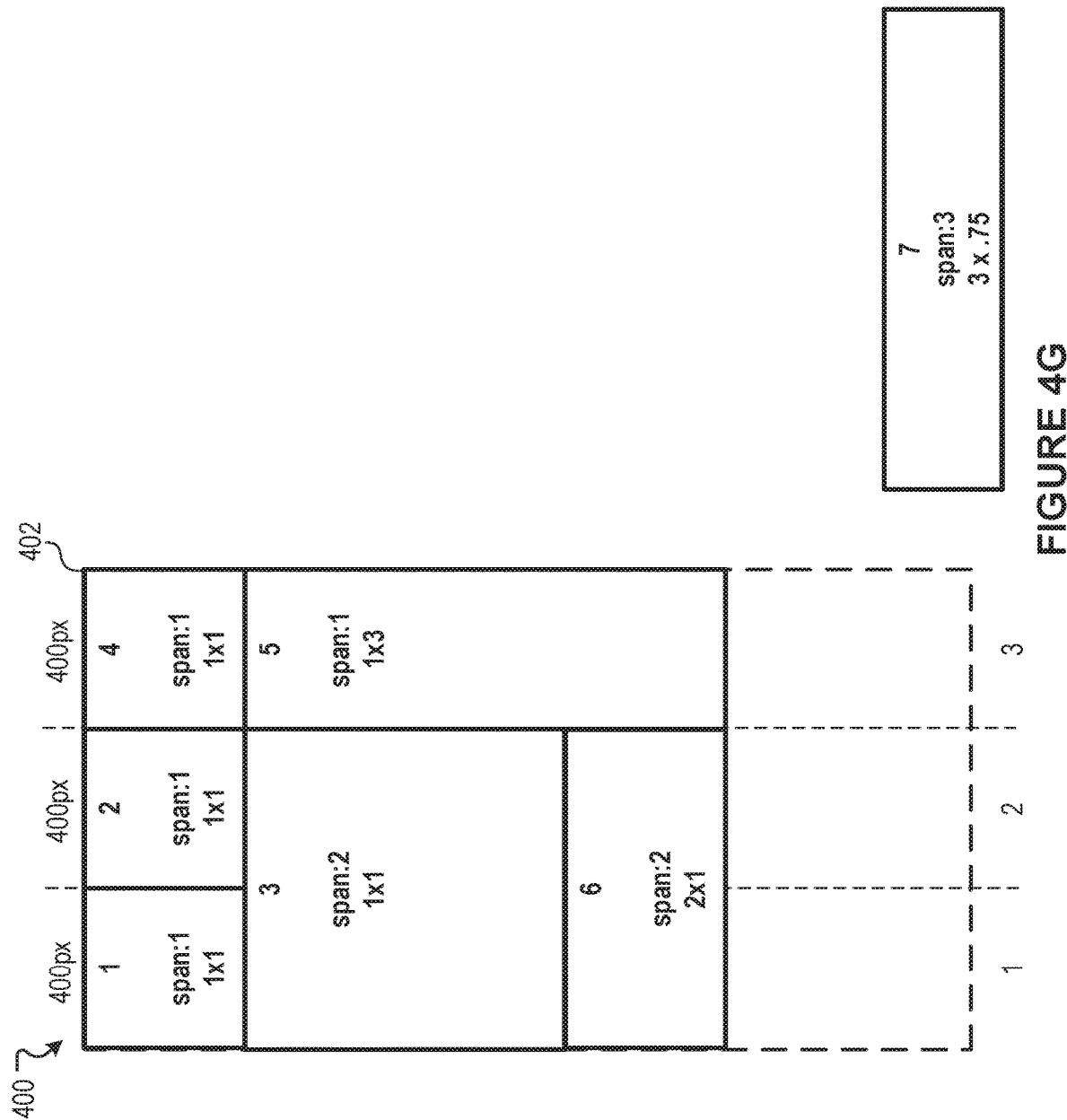

In the example scenario 400, the content grid layout manager module 204 selects the next content item (content item 6) and marks all the columns as unvisited. The content grid layout manager module 204 identifies columns 1 and 2 as the unvisited columns that have the smallest height values, and determines that content item 6 can fit in the left-most of those columns (column 1). So content item 6 is placed in column 1 (spanning into column 2), and the height values for columns 1 and 2 are updated to 400 pixels (FIG. 4G).

Figure 4H:
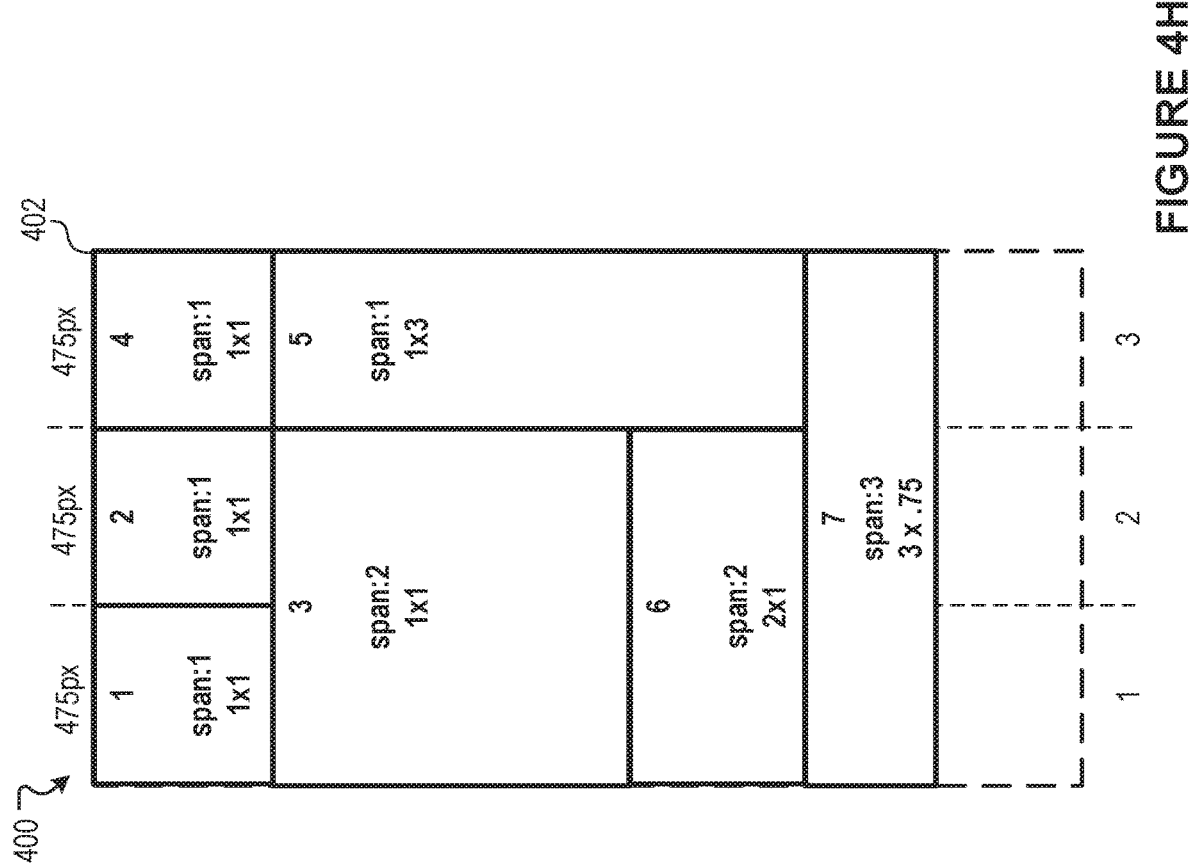

In the example scenario 400, the content grid layout manager module 204 then selects the next content item (content item 7) and marks all the columns as unvisited. The content grid layout manager module 204 identifies columns 1, 2, and 3 as being tied for the unvisited column that has the smallest height value, and determines that content item 7 can fit in the left-most of those columns (column 1). So content item 7 is placed in column 1 (spanning into columns 2 and 3), and the height values for columns 1, 2, and 3 are updated to 475 pixels (FIG. 4H).

As demonstrated in FIGS. 3 and 4A-H according to an example embodiment, the content grid layout manager module 204 can be configured to receive a set of content items, and arrange the set of content items for presentation in a content grid user interface. In certain embodiments, the content grid layout manager module 204 can create placeholder objects identifying the position of each content item in the content grid user interface. Then, at an appropriate time, the content grid layout manager module 204 can render a subset of the content items on a user computing device display. For example, in the example of a scrolling content feed, at any given time, a portion of the scrolling content feed may be displayed while other portions may be positioned above or below the displayed portion. As a user scrolls through the scrolling content feed, the content grid layout manager module 204 may render on the user device display appropriate content items based on the portion of the scrolling content feed being displayed.

Returning to FIG. 2, the content grid update module 206 can be configured to update a content grid user interface based on one or more changes to a set of content items. As discussed above, the content grid layout manager module 204 can be configured to receive a set of content items and arrange those content items (i.e., determine positions for those content items) within a content grid user interface. Once the set of content items have been arranged within the content grid user interface, subsequent changes to the set of content items may result in revisions to the placement of content items in the content grid user interface. For example, certain content items may be removed, added, and/or replaced with other content items.

In certain embodiments, certain types of changes may result in updates to only a portion of the content grid user interface (i.e., a partial update), whereas other types of changes may result in re-loading the entire content grid user interface based on an updated set of content items (i.e., a total update). For example, as discussed above, a set of content items may be an ordered set of content items such that there is an order or ranking to the set of content items and there will be a first content item and a last content item in the order. In an embodiment, adding one or more content items to the end of a set of content items may result in only a partial update such that any content items that have already been positioned in the content grid user interface are not re-processed (e.g., positions for those content items do not have to be re-calculated), and positions for the newly added content items are determined while maintaining the positions of the already-placed content items. In another example, in an embodiment, removing one or more content items from the end of a set of content items may result in a partial update such that content items occurring before the one or more content items being removed (e.g., ranked higher and/or ordered higher than the one or more content items being removed) are not re-processed, and the one or more content items (and/or placeholders for the one or more content items) are removed from the content grid user interface.

In certain embodiments, any revisions occurring in the beginning or the middle of a set of ordered content items (i.e., revisions that do not include the final content item in an ordered set of content items) may trigger a total update in which the positions of all content items are determined anew. In other embodiments, certain revisions occurring in the beginning or the middle of a set of ordered content items may trigger a partial update. For example, in an embodiment, if a content item is being replaced with another content item that has identical size information (e.g., same span value, same aspect ratio), the content item can be replaced without re-calculating positions for any of the other content items that are already positioned within the content grid user interface. Many variations are possible.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can receive a plurality of content items to be presented to a user in a content grid user interface, wherein the content grid user interface is divided into a plurality of columns, the plurality of content items are arranged in an order, and each content item of the plurality of content items is associated with and aspect ratio and a span value indicative of the number of columns the content item will occupy within the content grid user interface. At block 504, the example method 500 can select a first content item of the plurality of content items based on the order, wherein the first content item is associated with a first span value and a first aspect ratio. At block 506, the example method 500 can determine a position within the content grid user interfaced for the first content item based on the first span value and the first aspect ratio.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
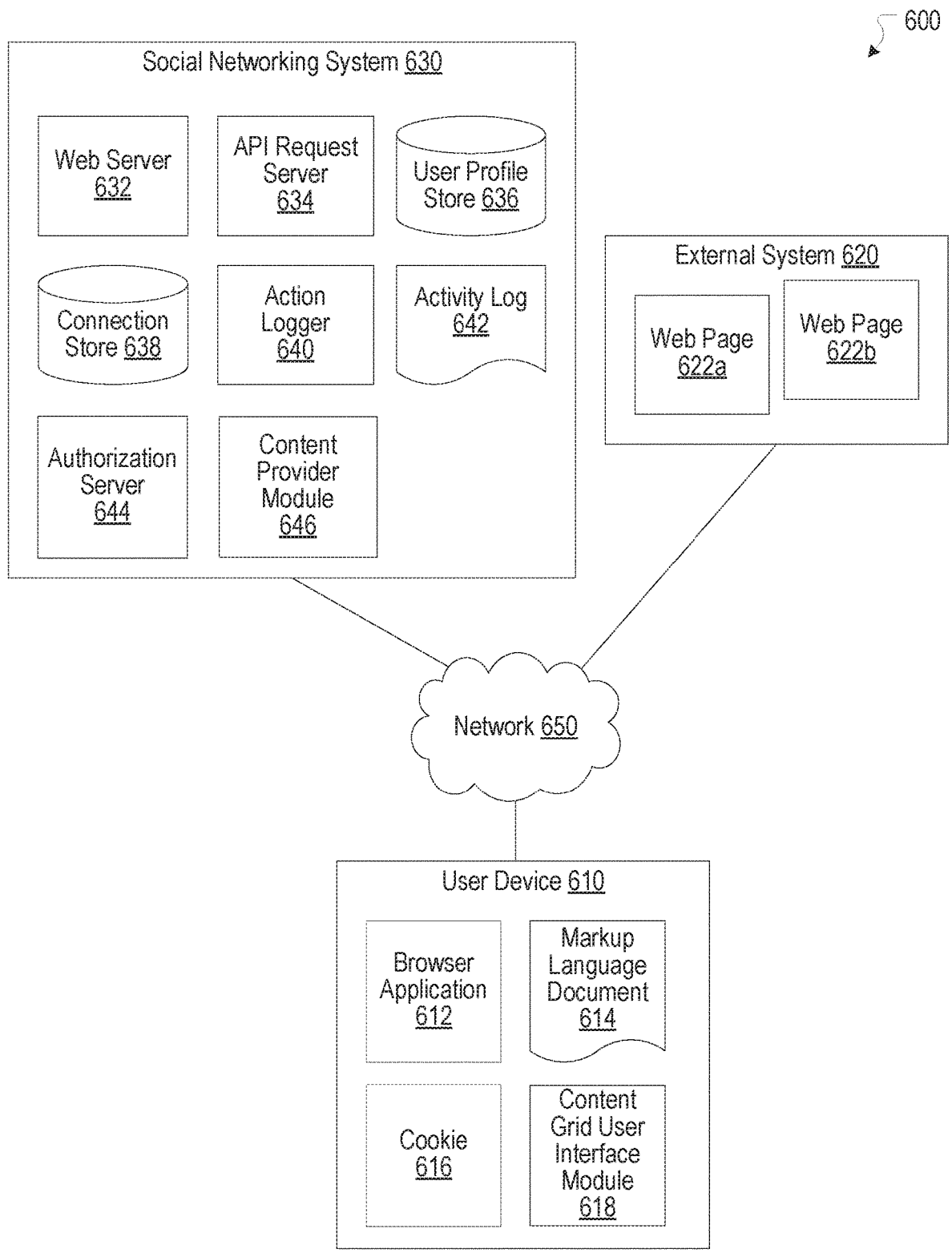
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. In some embodiments, the user device 610 can include a content grid user interface module 618. The content grid user interface module 618 can, for example, be implemented as the content grid user interface module 112 and/or the content grid user interface module 202, as discussed in more detail herein. As discussed previously, it should be appreciated that there can be many variations or other possibilities. For example, in some embodiments, one or more functionalities of the content provider module 646 can be implemented in the user device 610 and/or one or more functionalities of the content grid user interface module 618 can be implemented in the social networking system 630. As discussed previously, it should be appreciated that there can be many variations or other possibilities.

Hardware Implementation

Figure 7:
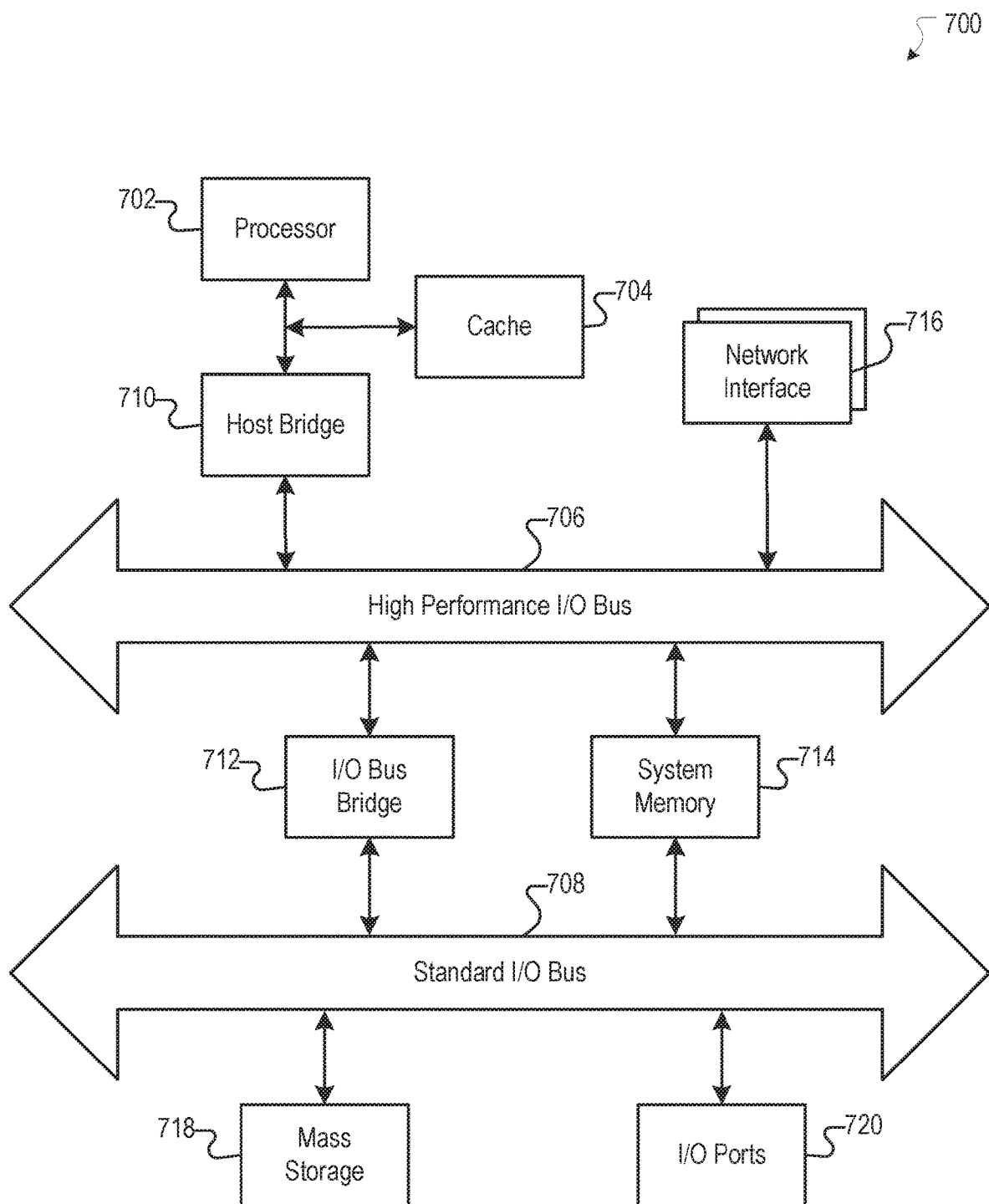
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
 receiving, by a computing system, a plurality of content items to be presented to a user in a grid-based scrollable content feed, wherein:
  the grid-based scrollable content feed is divided into a plurality of columns,
  the plurality of content items are arranged in an order, and
  each content item of the plurality of content items is associated with:
   an aspect ratio, and
   a span value indicative of the number of columns the content item will occupy within the grid-based scrollable content feed, wherein the span value of the content item is equal to or greater than a width of each column of the plurality of columns;
 for each content item of the plurality of content items, determining, by the computing system, a position within the grid-based scrollable content feed for the respective content item based on an associated span value and an associated aspect ratio, wherein the width of the respective content item is determined based on column width and the span value and the height of the respective content item is determined based on column width, the span value, and the antecedent and the consequent of the aspect ratio, wherein the determining the position within the grid-based scrollable content feed comprises:
 identifying one or more columns of the plurality of columns that have the smallest height value, wherein a height value of a column is equal to the height of one or more content items placed in the column; and
 determining whether the respective content item can fit within the highest available position of a leftmost column of the one or more columns of the plurality of columns that have the smallest height value based on the associated span value;
 and
 as the user scrolls through the grid-based scrollable content feed, providing, by the computing system and based on the determined positions, content items for display in a portion of the grid-based scrollable content feed being displayed.

2. The computer-implemented method of claim 1, wherein each column of the plurality of columns is associated with a height value measured from the top most position of the column and indicative of the lowest position in the column occupied by one or more content items.

3. The computer-implemented method of claim 1, wherein determining whether the respective content item can fit within the highest available position of the leftmost column of the one or more columns based on the associated span value comprises:
   determining that the respective content item cannot fit within the highest available position of the leftmost column of the one or more columns,
   marking the leftmost column of the one or more columns as visited, wherein the plurality of columns comprise a set of visited columns and a set of unvisited columns, and
   identifying one or more unvisited columns of the set of unvisited columns that have the smallest height value amongst the set of unvisited columns.

4. The computer-implemented method of claim 1, wherein determining the position within the grid-based scrollable content feed for a first content item comprises:
   positioning the first content item within a first column of the plurality of columns, and
   updating a height value associated with the first column based on the positioning the first content item within the first column.

5. The computer-implemented method of claim 4, wherein updating the height value associated with the first column comprises:
   calculating a height of the first content item based on a width of the first column and the aspect ratio.

6. The computer-implemented method of claim 5, wherein updating the height value associated with the first column further comprises:
   updating the height value associated with the first column based on the height of the first content item.

7. The computer-implemented method of claim 6, wherein the width of the first column, the height of the first content item, and the height value associated with the first column are measured in pixels.

8. The computer-implemented method of claim 1, wherein a position within the grid-based scrollable content feed for each content item in the plurality of content items is iteratively determined based on the order, and the order of the plurality of content items is based on ranking of the plurality of content items.

9. The computer-implemented method of claim 8, wherein the ranking is based on a predicted level of interest to the user.

10. A system comprising:
    at least one processor; and
    a memory storing instructions that, when executed by the at least one processor, cause the system to perform a method comprising:
        receiving a plurality of content items to be presented to a user in a grid-based scrollable content feed, wherein:
            the grid-based scrollable content feed is divided into a plurality of columns,
            the plurality of content items are arranged in an order, and
            each content item of the plurality of content items is associated with:
                an aspect ratio, and
                a span value indicative of the number of columns the content item will occupy within the grid-based scrollable content feed, wherein the span value of the content item is equal to or greater than a width of each column of the plurality of columns;
        for each content item of the plurality of content items, determining a position within the grid-based scrollable content feed for the respective content item based on an associated span value and an associated aspect ratio, wherein the width of the respective content item is determined based on column width and the span value and the height of the respective content item is determined based on column width, the span value, and the antecedent and the consequent of the aspect ratio, wherein the determining the position within the grid-based scrollable content feed comprises:
            identifying one or more columns of the plurality of columns that have the smallest height value, wherein a height value of a column is equal to the height of one or more content items placed in the column; and
            determining whether the respective content item can fit within the highest available position of a leftmost column of the one or more columns of the plurality of columns that have the smallest height value based on the associated span value; and
        as the user scrolls through the grid-based scrollable content feed, providing, based on the determined positions, content items for display in a portion of the grid-based scrollable content feed being displayed.

11. The system of claim 10, wherein each column of the plurality of columns is associated with a height value measured from the top most position of the column and indicative of the lowest position in the column occupied by one or more content items.

12. The system of claim 10, wherein determining whether the respective content item can fit within the highest available position of the leftmost column of the one or more columns based on the associated span value comprises:
    determining that the respective content item cannot fit within the highest available position of the leftmost column of the one or more columns,
    marking the leftmost column of the one or more columns as visited, wherein the plurality of columns comprise a set of visited columns and a set of unvisited columns, and
    identifying one or more unvisited columns of the set of unvisited columns that have the smallest height value amongst the set of unvisited columns.

13. The system of claim 10, wherein determining the position within the grid-based scrollable content feed for a first content item comprises:
    positioning the first content item within a first column of the plurality of columns, and
    updating a height value associated with the first column based on the positioning the first content item within the first column.

14. The system of claim 13, wherein updating the height value associated with the first column comprises:
    calculating a height of the first content item based on a width of the first column and the aspect ratio.

15. The system of claim 14, wherein updating the height value associated with the first column further comprises:
    updating the height value associated with the first column based on the height of the first content item.

16. A non-transitory computer-readable storage medium including instructions that, when executed by at least one processor of a computing system, cause the computing system to perform a method comprising:
    receiving a plurality of content items to be presented to a user in a grid-based scrollable content feed, wherein:
        the grid-based scrollable content feed is divided into a plurality of columns,
        the plurality of content items are arranged in an order, and
        each content item of the plurality of content items is associated with:
            an aspect ratio, and
            a span value indicative of the number of columns the content item will occupy within the grid-based scrollable content feed, wherein the span value of the content item is equal to or greater than a width of each column of the plurality of columns;
    and
    for each content item of the plurality of content items, determining a position within the grid-based scrollable content feed for the respective content item based on an associated span value and an associated aspect ratio, wherein the width of the respective content item is determined based on column width and the span value and the height of the respective content item is determined based on column width, the span value, and the antecedent and the consequent of the aspect ratio, wherein the determining the position within the grid-based scrollable content feed comprises:
        identifying one or more columns of the plurality of columns that have the smallest height value, wherein a height value of a column is equal to the height of one or more content items placed in the column; and
        determining whether the respective content item can fit within the highest available position of a leftmost column of the one or more columns of the plurality of columns that have the smallest height value based on the associated span value; and
    as the user scrolls through the grid-based scrollable content feed, providing, based on the determined positions, content items for display in a portion of the grid-based scrollable content feed being displayed.

17. The non-transitory computer-readable storage medium of claim 16, wherein each column of the plurality of columns is associated with a height value measured from the top most position of the column and indicative of the lowest position in the column occupied by one or more content items.

18. The non-transitory computer-readable storage medium of claim 16, wherein determining whether the respective content item can fit within the highest available position of the leftmost column of the one or more columns based on the associated span value comprises:
    determining that the respective content item cannot fit within the highest available position of the leftmost column of the one or more columns,
    marking the leftmost column of the one or more columns as visited, wherein the plurality of columns comprise a set of visited columns and a set of unvisited columns, and
    identifying one or more unvisited columns of the set of unvisited columns that have the smallest height value amongst the set of unvisited columns.

19. The non-transitory computer-readable storage medium of claim 16, wherein determining the position within the grid-based scrollable content feed for a first content item comprises:
    positioning the first content item within a first column of the plurality of columns, and
    updating a height value associated with the first column based on the positioning the first content item within the first column.

20. The non-transitory computer-readable storage medium of claim 19, wherein updating the height value associated with the first column comprises:
    calculating a height of the first content item based on a width of the first column and the aspect ratio.

* * * * *